United States Patent
Kim

(10) Patent No.: US 11,959,451 B2
(45) Date of Patent: Apr. 16, 2024

(54) PUMPED-STORAGE HYDROPOWER GENERATION TOWER EMPLOYING CONDUIT TURBINES INSTALLED IN MULTIPLE STAGES

(71) Applicant: Seongsik Kim, Ansan-si (KR)

(72) Inventor: Seongsik Kim, Ansan-si (KR)

(*) Notice: Subject to any disclaimer, the term of this patent is extended or adjusted under 35 U.S.C. 154(b) by 219 days.

(21) Appl. No.: 17/610,678

(22) PCT Filed: Sep. 6, 2019

(86) PCT No.: PCT/KR2019/011533
§ 371 (c)(1),
(2) Date: Nov. 11, 2021

(87) PCT Pub. No.: WO2020/050676
PCT Pub. Date: Mar. 12, 2020

(65) Prior Publication Data
US 2022/0213860 A1 Jul. 7, 2022

(30) Foreign Application Priority Data

Sep. 7, 2018 (KR) .................. 10-2018-0107129
Sep. 17, 2018 (KR) .................. 10-2018-0110623

(51) Int. Cl.
*F03B 13/08* (2006.01)
*F03B 3/04* (2006.01)
(Continued)

(52) U.S. Cl.
CPC ............. *F03B 13/083* (2013.01); *F03B 3/04* (2013.01); *F03B 11/00* (2013.01); *F03B 11/063* (2013.01);
(Continued)

(58) Field of Classification Search
CPC .......... F03B 17/06; F03B 11/063; F03B 3/04; F03B 13/083
See application file for complete search history.

(56) References Cited

U.S. PATENT DOCUMENTS 6,203,117 B1 * 3/2001 Starr ............... B60T 8/4068
303/DIG. 11
8,669,671 B2 * 3/2014 Efraty ............... F03D 9/257
290/55
(Continued)

FOREIGN PATENT DOCUMENTS

JP 2002-242811 A 8/2002
JP 2003-214309 A 7/2003
(Continued)

*Primary Examiner* — Abiy Teka
(74) *Attorney, Agent, or Firm* — Maschoff Brennan

(57) ABSTRACT

A pumped-storage hydropower generation tower employing conduit turbines installed in multiple stages, according to the present invention, comprises: a pump (400) disposed in a pumping-up pipe (410) so as to pump up water that fills a lower reservoir (300) to an upper reservoir (200); a water-guide pipe channel (500) having an inlet water-guide conduit (510) connected to the bottom surface on one side of the upper reservoir (200) so as to extend to the position of the lower reservoir (300) along a helical sloping channel (100) such that a flow rate for power generation passes therein; and a conduit turbine unit (600) comprising a driving shaft (2) extending through the center of a conduit (22) through which the flow rate passes, conduit support bodies (4) installed so as to rotate freely while supporting the driving shaft (2), the conduit support bodies (4) having arms (6) extending toward the inner surface of the conduit (22), a propeller (7) fixed to the driving shaft (2) between the conduit support bodies (4) so as to be rotated by movement of the flow rate, and a generator (10) configured to receive rotational power from the driving shaft (2) and to generate (Continued)

electricity, wherein at least two conduit turbine units (600) are disposed in multiple stages along the water-guide pipe channel (500).

7 Claims, 9 Drawing Sheets

(51) Int. Cl.
| | |
|---|---|
| *F03B 11/00* | (2006.01) |
| *F03B 11/06* | (2006.01) |
| *F03B 13/06* | (2006.01) |
| *F03B 17/06* | (2006.01) |
| *H02K 7/116* | (2006.01) |
| *H02K 7/18* | (2006.01) |

(52) U.S. Cl.
CPC ............ *F03B 13/06* (2013.01); *F03B 13/08* (2013.01); *F03B 17/06* (2013.01); *H02K 7/116* (2013.01); *H02K 7/1823* (2013.01); *F05B 2220/706* (2013.01); *F05B 2260/4031* (2013.01)

(56) References Cited

U.S. PATENT DOCUMENTS

| | | | |
|---|---|---|---|
| 2010/0253080 A1* | 10/2010 | DeAngeles | ........... F03B 17/005 290/52 |
| 2014/0319840 A1* | 10/2014 | Lu | ........................ F03B 13/06 290/54 |

FOREIGN PATENT DOCUMENTS

| | | |
|---|---|---|
| JP | 2009-228462 A | 10/2009 |
| JP | 2015-535331 A | 10/2015 |
| KR | 10-0899988 B1 | 5/2009 |
| KR | 10-1505558 B1 | 4/2015 |
| KR | 20-0478748 B1 | 11/2015 |
| KR | 2016-0025848 A | 3/2016 |
| KR | 10-1769080 B1 | 8/2017 |
| KR | 10-1868973 B1 | 6/2018 |
| WO | 2017/146349 A1 | 8/2017 |

\* cited by examiner

PUMPED-STORAGE HYDROPOWER GENERATION TOWER EMPLOYING CONDUIT TURBINES INSTALLED IN MULTIPLE STAGES

TECHNICAL FIELD

The present disclosure relates to a pumped-storage hydropower generation tower employing conduit turbines installed in multiple stages, and more particularly, to a pumped-storage hydropower generation tower in which conduits are connected along a spiral inclined passage of the cylindrical tower of a spiral structure to secure a difference in elevation between the upper and lower reservoirs and conduit turbines are installed in multiple stages in the water-guide conduit through which a power generation flow pumped by a pump moves along the spiral passage to generate a lot of power at low cost, maintain the quality of power and stably supply the power.

BACKGROUND ART

An energy storage system (ESS) is used to construct an uninterruptible power supply (UPS) or to store generated power. The ESS stores excessively produced power or commercial power and provides the power when power is temporarily insufficient or interrupted. The ESS usually takes the form of a battery employing lithium-ion batteries or the like. The economic feasibility of ESSs is dropping and the price thereof is increasing due to increase in the price of raw materials.

Pumped-storage hydropower generation requires selection of mountainous terrain with high elevation differences and a dam or reservoir to secure a fall. Accordingly, it is difficult to apply such pumped-storage hydropower generation to urban areas, factories, or solar power generation complexes. Furthermore, even if a pumped-storage power generation system is built in such areas, space constraints and system configuration related cost burdens are large because large turbines and large generators should be installed.

When a backup turbine and generator are installed in order to increase the stability of the system, constraints and burdens will be further increased.

Prior art document 1: Korean Utility Model No. 20-0478748 (registered on Nov. 5, 2015)

Prior art document 2: Korean Patent No. 10-1868973 (issued on Jun. 12, 2018)

DISCLOSURE

Technical Problem

It is an object of the present disclosure to build a power storage and production system capable of efficient power generation at low cost.

It is another object of the present disclosure to provide a system that may be used to build an ESS using potential energy of water.

It is another object of the present disclosure to provide a power storage and production system that may be constructed in a short period of time in a desired area and may be easily expanded because there is no restriction on the installation site.

It is another object of the present disclosure to provide a power storage and production system that does not emit pollutants, is eco-friendly, and has high stability at an economical cost.

Technical Solution

In accordance with one aspect of the present disclosure, provided is a pumped-storage hydropower generation tower employing conduit turbines installed in multiple stages, including a pump 400 piped to a pumping pipe 410 to pump water contained in a lower reservoir 300 to an upper reservoir 200; a water-guide conduit line 500 connected to an inlet water-guide conduit 510 from a bottom surface of one side of the upper reservoir 200 and extending to a position of the lower reservoir 300 along a spiral inclined passage 100 to allow a flow for power generation to pass therethrough; and a conduit turbine unit 600 including a drive shaft 2 extending through a center of a conduit 22, the flow passing through the conduit 22; a conduit support body 4 arranged to rotatably support the drive shaft 2, and having an arm 6 extending toward an inner surface of the conduit 22; a propeller 7 fixed to the drive shaft 2 in between the conduit support body 4 and rotated by movement of the flow; and a generator 10 configured to generate electricity by rotational power received from the drive shaft 2, wherein the conduit turbine unit 600 has at least two conduit turbine units 600 disposed in the water-guide conduit line 500 in multiple stages.

In the pumped-storage hydropower generation tower, the conduit turbine unit 600 may further include an inner gear 8 arranged in between the conduit support body 4 and rotated together with the drive shaft 2; and an outer gear 13 arranged outside the conduit 22 and driven together with a shaft 15 when rotational power is transmitted to the inner gear 8 through a power transmission means, wherein the generator 10 may receiver rotational power through the outer gear 13 and the shaft 15.

In the pumped-storage hydropower generation tower, a leading end of each of the conduit support body 4 may be provided with a pressure support 3, the pressure support 3 being integrally coupled to the drive shaft 2, wherein a thrust bearing 26 may be arranged between contact portions of the conduit support body 4 and the pressure support 3.

In the pumped-storage hydropower generation tower, the arm 6 of the conduit support body 4 may have a flat plate shape having a cross-sectional area causing minimum resistance against streamline and an axial length greater than a radius of the conduit 22.

The pumped-storage hydropower generation tower may further include a flexible conduit 18 extending from a lower end of the conduit 22 and formed in a corrugated tube structure.

The pumped-storage hydropower generation tower may further include a spiral inclined passage 100 supported by a plurality of inner frame pillars 116 and outer frame pillars 114, and extending from a ground to a predetermined height in a spiral shape; an upper reservoir 200 positioned at an upper portion of the spiral inclined passage 100 and filled with water while being supported by the inner frame pillars 116 and the outer frame pillars 114; and a lower reservoir 300 positioned on the ground while maintaining a height difference from the upper reservoir 200.

The pumped-storage hydropower generation tower may further include an elevator 700 installed in an inner center of the spiral inclined passage 100 to move from the ground to each floor and an uppermost position of the upper reservoir 200.

Advantageous Effects

In a pumped-storage hydropower generation tower employing conduit turbines installed in multiple stages according to the present disclosure, a conduit turbine unit 600 may be constructed using a low-cost compact propeller 7, a generator 10, and the like, and may be installed in multiple stages instead of water-guide conduit. Accordingly, large electric power may be stored and produced at low cost, and the number of conduit turbines may be easily increased or decreased as needed.

In addition, since the pumped-storage hydropower generation tower employing conduit turbines installed in multiple stages according to the present disclosure has conduit turbines installed at the location instead of the water-guide conduit line 500, efficient power storage and production may be implemented, and installation space may be saved.

In addition, with the pumped-storage hydropower generation tower employing conduit turbines installed in multiple stages according to the present disclosure, an ESS based on potential energy of water may be constructed by installing the turbines in multiple stages along a spiral line between the upper reservoir 200 and the lower reservoir 300.

In addition, in the pumped-storage hydropower generation tower employing conduit turbines installed in multiple stages according to the present disclosure, a large number of conduit turbine units 600 is installed in multiple stages. Accordingly, even when one or two of the conduit turbine units fail, the remaining conduit turbine units 600 can normally generate power, and therefore stability of power supply is high and the tower may be implemented at low cost.

In addition, with the pumped-storage hydropower generation tower employing conduit turbines installed in multiple stages according to the present disclosure, a power generation apparatus may be easily installed by connecting conduits.

In addition, the pumped-storage hydropower generation tower employing conduit turbines installed in multiple stages according to the present disclosure may be easily installed in an area having power demands and may greatly increase power generation capacity at a given flow rate.

In addition, the pumped-storage hydropower generation tower employing conduit turbines installed in multiple stages according to the present disclosure may be constructed by selecting an area having an actual demand. Accordingly, it may minimize the construction of transmission towers or transmission lines and may be expanded in a short period to increase the total power generation capacity.

Further, the pumped-storage hydropower generation tower employing conduit turbines installed in multiple stages according to the present disclosure neither causes damage to the natural environment, nor emits any environmental pollutants in the power generation process. Accordingly, it may obtain clean energy and operate in any area throughout the year to generate power.

BEST MODE

Figure 1:
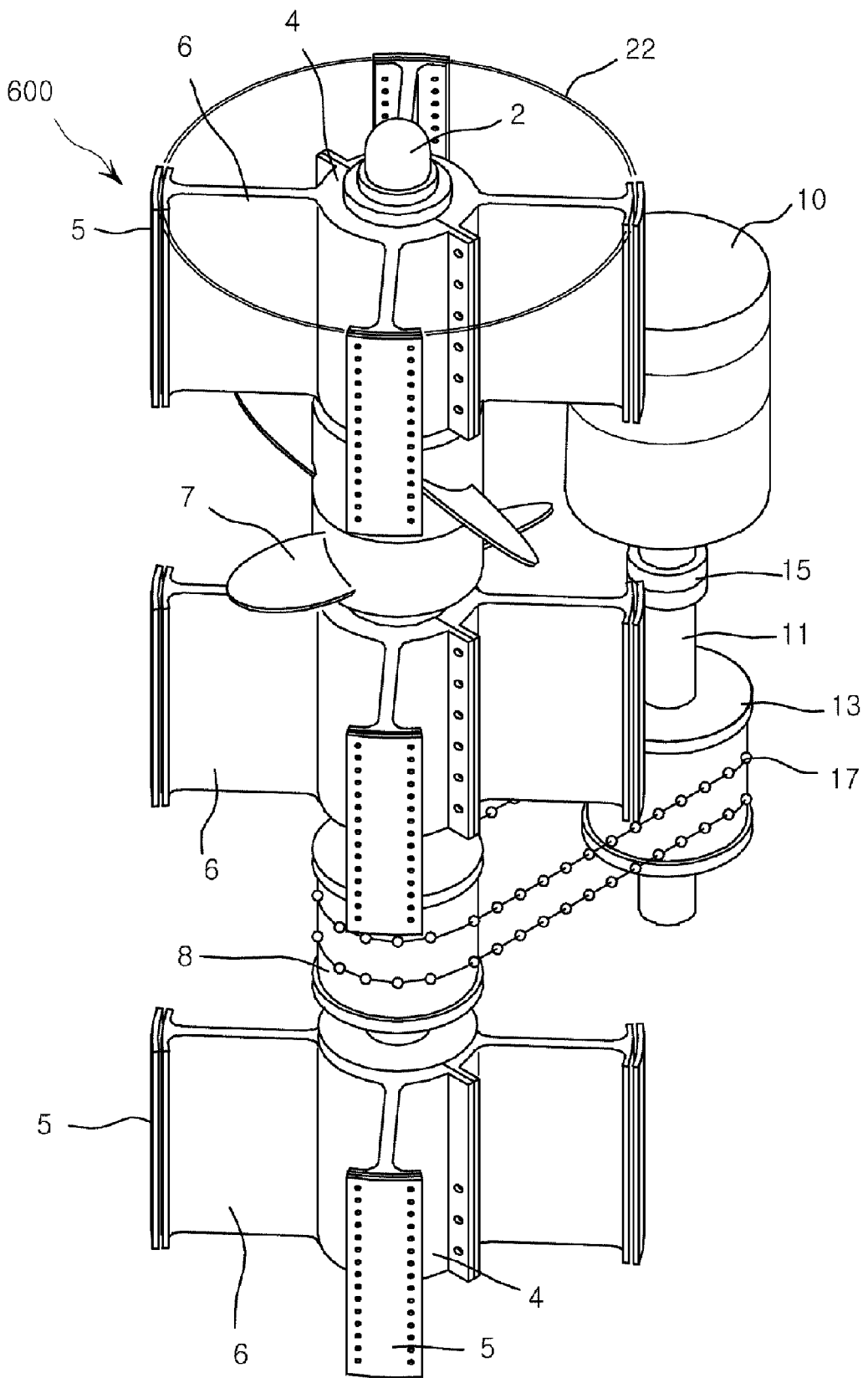
FIG. 1 is a perspective view showing the configuration of a conduit turbine unit according to an embodiment of the present disclosure.
Figure 2:
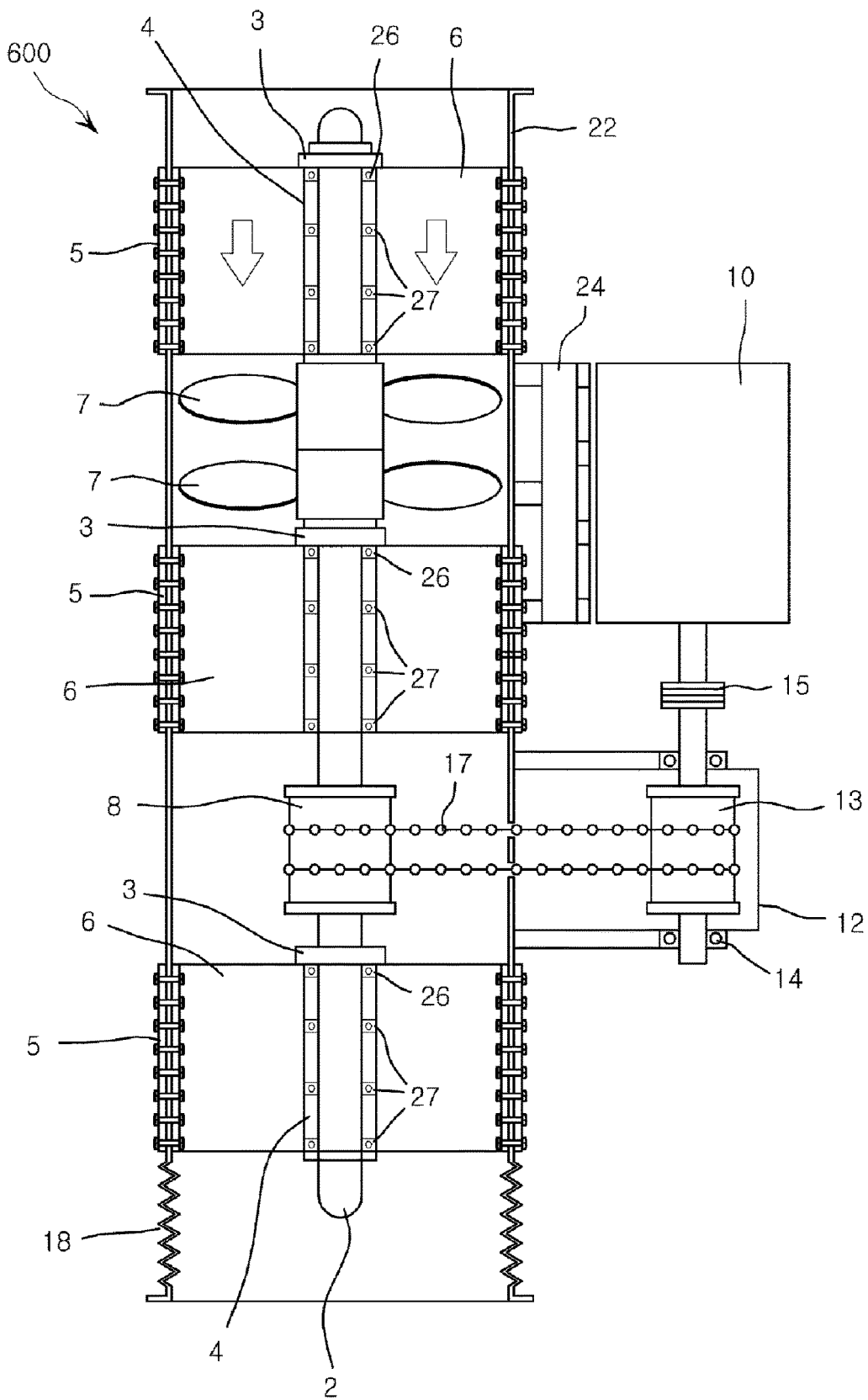
FIG. 2 is a longitudinal sectional view of FIG. 1.

Objects, specific advantages and novel features of the present disclosure will become apparent from the following detailed description and embodiments associated with the accompanying drawings. In the present specification, in adding reference numerals to elements in each drawing, it should be noted that the same elements are assigned the same reference numerals, even if they are presented in different drawings.

In describing the present disclosure, a detailed description of known functions and configurations incorporated herein will be omitted to avoid obscuring the subject matter of the present disclosure. In the accompanying drawings, some components are exaggerated, omitted, or schematically illustrated, and the dimensions of components do not precisely reflect the actual dimensions thereof.

Hereinafter, embodiments of the present disclosure will be described in detail with reference to the accompanying drawings.

A pumped-storage hydropower generation tower employing conduit turbines installed in multiple stages according to a preferred embodiment of the present disclosure may pump water from a lower reservoir 300 to an upper reservoir 200 mostly at night or when there is spare power generation capacity, and may be used to generate power when power consumption increases or when an emergency situation such as power outage occurs.

A difference in elevation and a flow rate are secured by pumping up water. In the structure of the pumped-storage hydropower generation tower, a spiral inclined road 100 is installed and is supported by several internal frame pillars 116 and external frame pillars 114.

The spiral inclined road 100 is a reinforced concrete structure that continues in a spiral shape from the first floor on the ground to the top floor, and a cylindrical space is formed in the inner center part thereof. The pumped-storage hydropower generation tower is constructed as a structure having a cylindrical shape as a whole.

In the pumped-storage hydropower generation tower of the present disclosure, several external frame pillars 114 are erected on the outside along the cylinder, and several internal frame pillars 116 are erected inside along the cylindrical center space to stably support the entire structure.

The spiral inclined road 100 is connected to one inclined road along a spiral like a 360-degree curved road from the ground to the top floor, thereby securing a sufficient length for arrangement of a plurality of conduit turbine units 600.

The spiral inclined road 100 is formed as a spiral that rotates several times along the circumference, such that the water-guide conduit line 500 extending to the top and the plurality of conduit turbine units 600 are connected smoothly without being sharply bent. Thus, pressure loss occurring at a bent part is prevented.

An upper reservoir 200 filled with water is located at the top of the spiral inclined road 100. The upper reservoir 200 is also firmly supported by the internal frame pillars 116 and the external frame pillars 114.

In addition, a lower water reservoir 300 filled with water is arranged on the ground or at a position close to the ground while maintaining a height difference from the upper water reservoir 200, and a pumping pipe 410 is arranged and connected between the upper water reservoir 200 and the lower water reservoir.

The lower reservoir 300 may be formed to be slightly larger than the upper reservoir 200 to contain a larger amount of fluid, and a pump 400 is installed in the pumping pipe 410 to pump water contained in the lower reservoir 300 to the upper reservoir 200.

At this time, the lower water reservoir 300 is directly connected to a hood conduit of the pump 400, and a filter having a filter structure is installed in front of the hood conduit to block the inflow of various foreign substances including solids.

The pump 400 having a sufficient pumping capacity is selected, and a spare pump may be further installed so as to be selectively operated in case of an emergency.

In the present disclosure, in order to secure water to be used and to make up for the amount of fluid that decreases due to evaporation or the like, groundwater may be drawn, or water may be pumped and supplied from a municipal water supply, or a nearby river or lake. In order to drive the pumped-storage hydropower generation tower of the present disclosure, a facility including a central control room and a transformer, and auxiliary facilities such as an office may be provided together.

The water-guide conduit line 500 is arranged along the upper surface of the spiral inclined road 100 such that the power generation fluid contained in the upper reservoir 200 may be moved to the position of the lower reservoir 300 through the water-guide conduit line 500 by a difference in elevation.

The upper reservoir 200 may be formed in the shape of a container with a closed bottom and an open or closed top and located on the top floor of the pumped-storage hydropower generation tower. The upper reservoir may have a floor area equal to or similar to the area of the pumped-storage hydropower generation tower.

According to the present disclosure, it is necessary to design a storage capacity of the upper reservoir 200 and construct the same to enable power generation for a time for emergency replacement or a time for power replenishment in an emergency such as upon power failure or in a situation such as power shortage. In addition, at normal times or when there is surplus power, the pump 400 pumps water from the lower reservoir 300 to the upper reservoir 200 through the pumping pipe 410 so as to be prepared for power generation.

Figure 7:
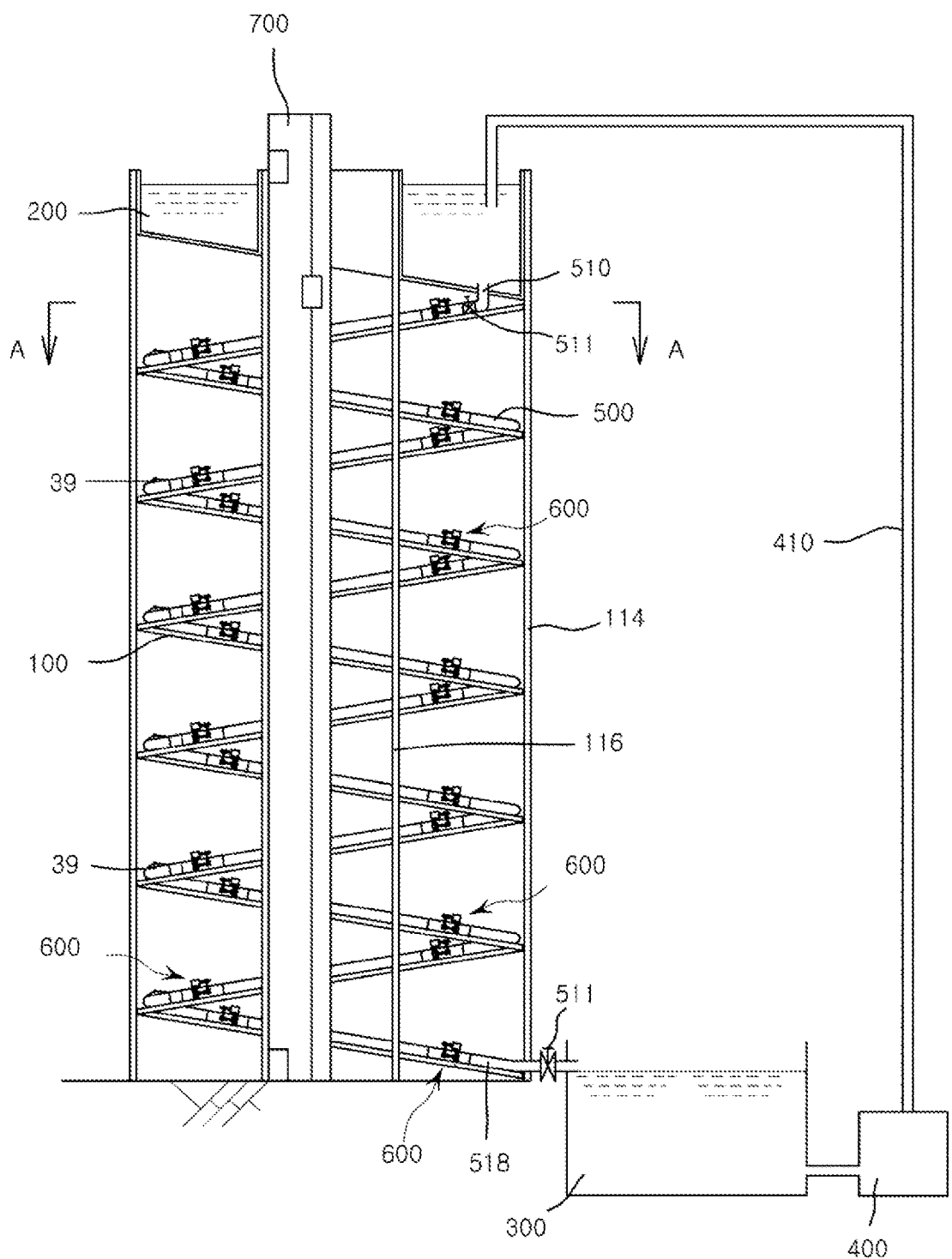
FIG. 7 is a longitudinal sectional view showing an overall configuration of an apparatus of the present disclosure.

The upper reservoir 200 has a bottom surface inclined to one side as shown in FIG. 7. An inlet water-guide conduit 510 and a valve located at an upper end of the water-guide conduit line 500 are sequentially connected to the bottom surface at the one side.

Preferably, a filter may be installed at the inlet water-guide conduit 510 to prevent foreign matter such as solids from being contained in the flow and supplied to the conduit turbine unit 600.

In addition, to prevent rapid supply of the fluid from creating a whirling stream causing air to be introduced into the conduit, multiple partition boards are arranged in a zigzag manner so as to suppress generation of air bubbles. Automatic air vents 39 may be further installed in the middle of the water-guide conduit line 500. In addition, railings or partition walls may be installed on the outer frame pillar 114 and the inner frame pillar 116, which are arranged all the way to the position of the upper reservoir 200.

In addition, a valve 511 is installed at a flow outlet at the lower end of the water-guide conduit line 500 to control the flow directed to the lower reservoir 300.

Figure 6:
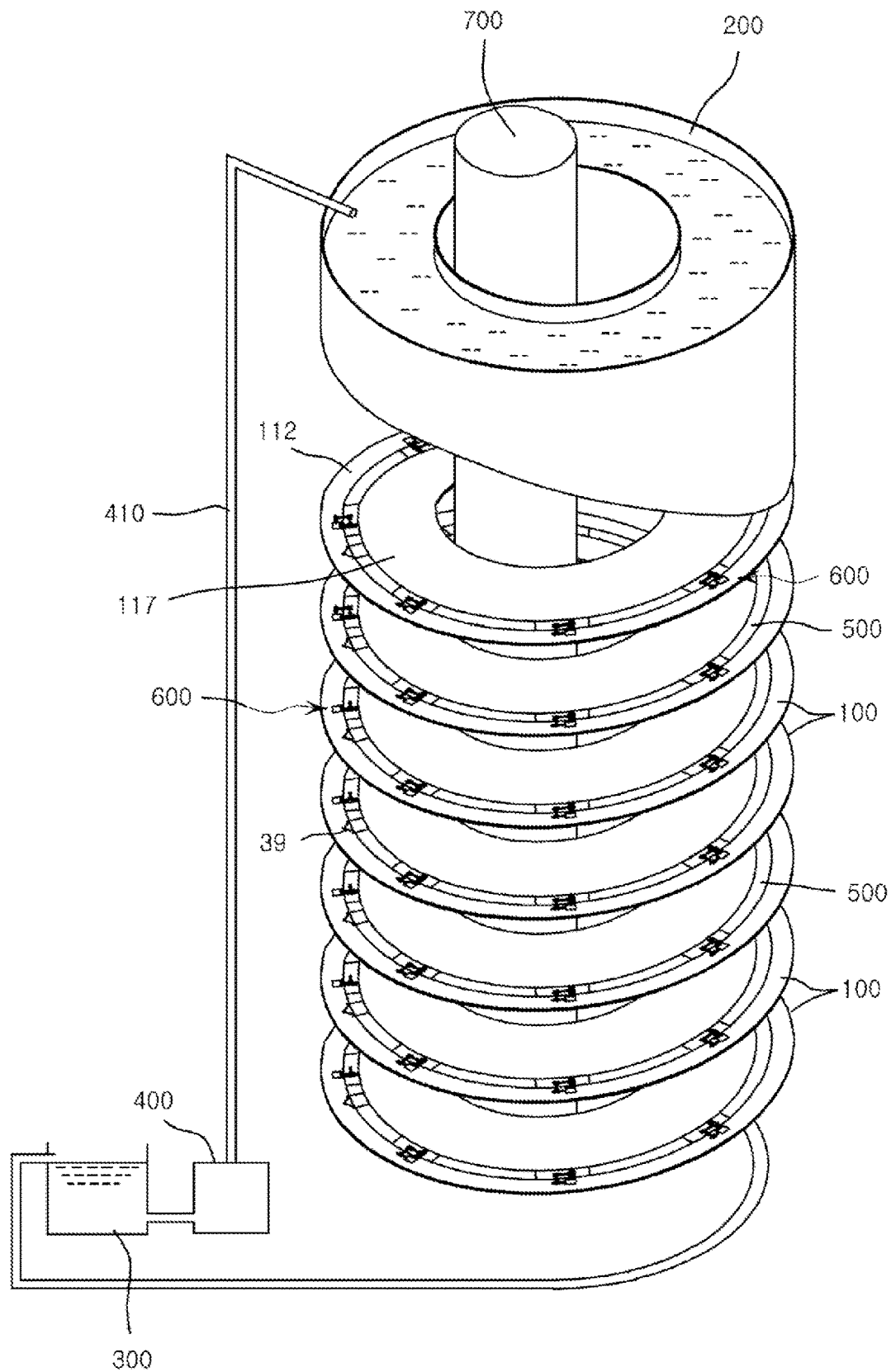
FIG. 6 is a perspective view showing a main part in which the conduit turbine unit according to an embodiment of the present disclosure is installed in multiple stages in a spiral shape along a water-guide conduit line.
Figure 8:
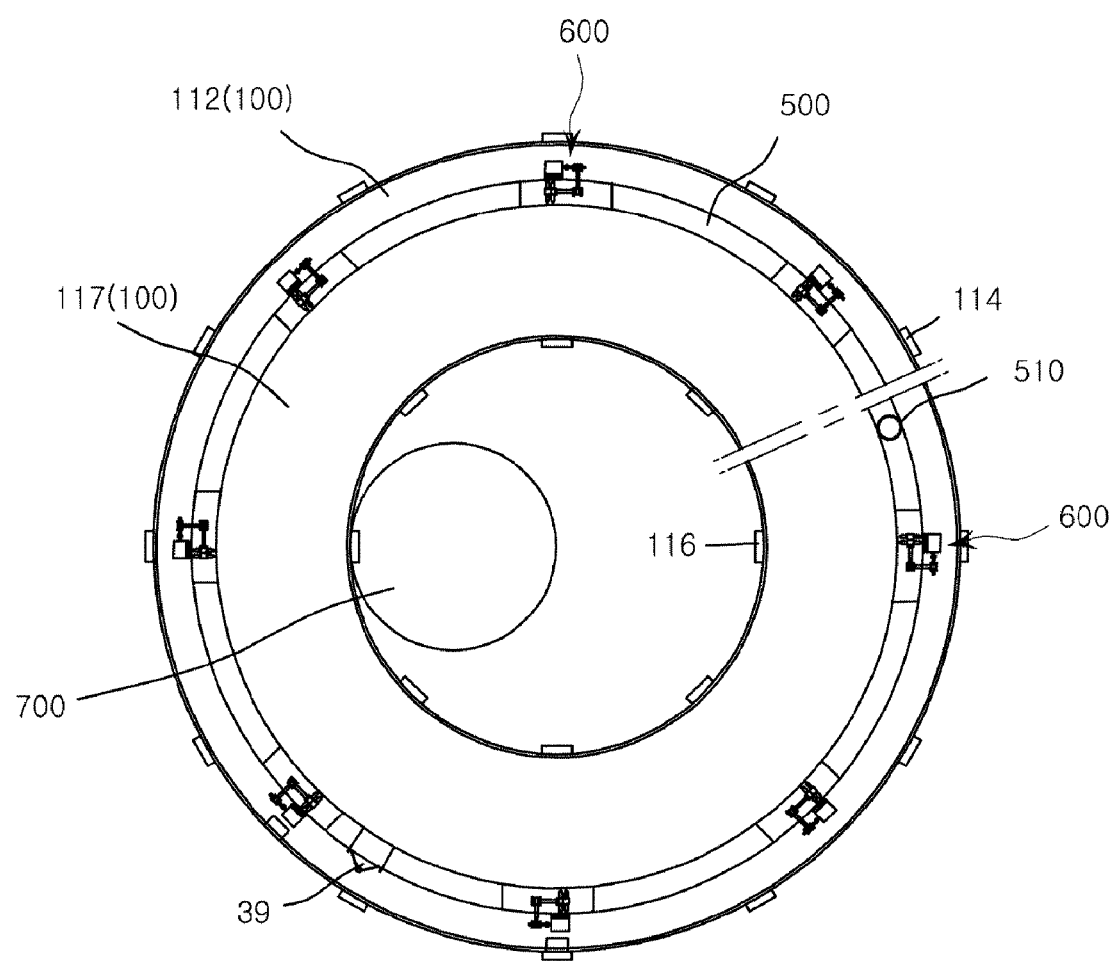
FIG. 8 is a cross-sectional view taken along line A-A of FIG. 7.
Figure 9:
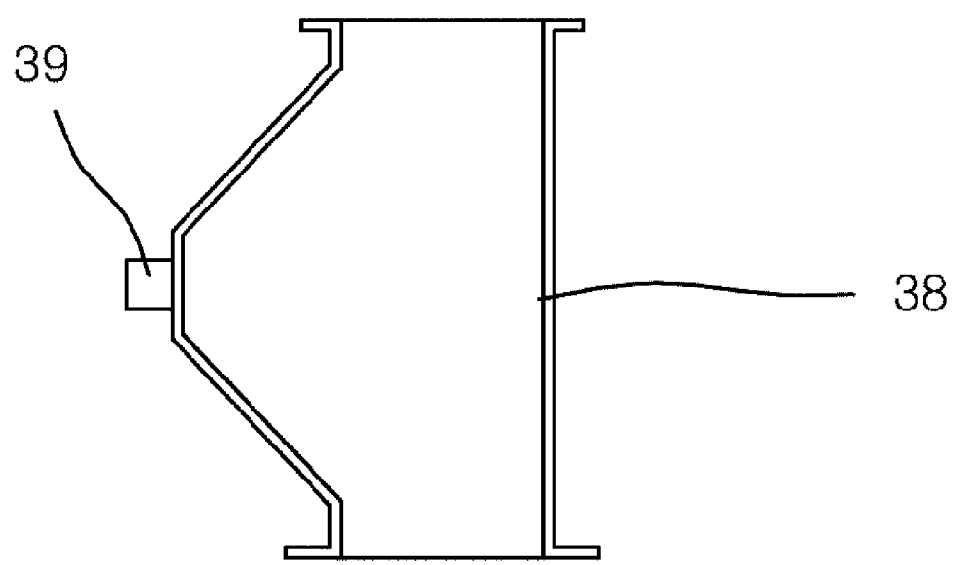
FIG. 9 is a cross-sectional view showing the configuration of an air vent pipe equipped with an air vent.

At least two conduit turbine units 600, preferably five or more conduit turbine units, are installed in series in multiple stages on the water-guide conduit line 500 through which the flow for power generation passes. While the conduit turbine unit 600 is shown in FIGS. 6 to 8 to have a curvature, it has a straight line shape corresponding to a straight drive shaft 2 except for a flexible tube 18, which will be described later.

Each conduit turbine unit 600 converts the potential energy of a fluid (water) secured by pumping into kinetic energy and converts the kinetic energy into electrical energy. When the power generation capacities of the respective small-capacity conduit turbine units 600 are summed, the total power generation capacity may be increased to a large capacity.

The drive shaft 2, which is installed at the center of the conduit 22 through which the fluid (water) moves in the conduit turbine unit 600 is supported by a conduit support body 4, such that the rotational motion of the drive shaft 2 is stably maintained.

The conduit support body 4 is supported on the inner surface of the conduit 22 by multiple (preferably four) arms 6 of the same length. The arm 6 is fastened to a fixing member 5, which is located on the outer surface of the conduit 22 by multiple bolts to stably support the rotation of the drive shaft 2 while maintaining coaxial arrangement of the conduit 22 and the drive shaft 2.

The conduit support body 4 is divided into, for example, two parts having flanges connected by bolts, and is assembled in a cylindrical shape with bearings 26 and 27 installed therein.

For example, three bearings 27 are provided between the contact portions of the conduit support body 4 and the drive shaft 2, thereby supporting rotation of the drive shaft 2. In particular, thrust bearings 26 are provided between the contact portions of the conduit support body 4 and a pressure support 3, such that the pressure support 3, which applies an axial load to the conduit support body 4 and the drive shaft 2 may be supported while rotating without any resistance.

The leading end of the drive shaft 2 is formed in a semicircular or pointed conical shape to reduce head resistance, and a pressure support 3 is installed at the leading end side of each conduit support body 4 so as to be integrally coupled to the drive shaft 2. Thus, the load such as the drive shaft 2 is allowed to freely rotate by the thrust bearing 26 described above while being supported by each conduit support body 4.

The pressure support 3 is installed at the leading end of each conduit support body 4. When the flow rate of fluid flowing through the conduit 22 is high and the fluid volume is large, a large pressure is produced and the gravity load is large. Thus, the conduit support body 4 may be installed in three places as shown in the drawing to stably support the drive shaft 2 and to distribute pressure and load.

In addition, the arm 6 of the conduit support body 4 is formed in a flat shape so as to minimize the cross-sectional area thereof causing resistance against streamline and has a length that is at least greater than the radius of the conduit 22. Accordingly, it may correct the streamline disturbed by the propeller 7, thereby improving power generation efficiency.

One or more propellers 7 are arranged between the conduit support bodies 4, such that when the fluid flows into the conduit 22, the propellers 7 and the drive shaft 2 are rotated together by the flow condition quantity (free fall, fluid volume, flow rate). For example, while the figures show that two two-wing propellers 7 are arranged on the drive shaft 2 in series, various embodiments are possible. For example, one or two four-wing propellers 7 may be provided.

Part of the rectilinear kinetic energy of the fluid is converted into rotational kinetic energy by the propellers 7, and the generator 10 may be driven through an inner gear 8 and an outer gear 13. The inner gear 8 is fixedly installed on the drive shaft 2 inside the conduit 22 so as to be driven together with the drive shaft 2. The outer gear 13 arranged outside the conduit and driven by the rotational power transmitted from the inner gear 8 is connected to the generator 10.

A ball chain 17 made of stainless steel wire is provided as a means to connect the inner gear 8 and the outer gear 13 to transmit rotational power. Since there is no concern about mechanical damage or corrosion inside the conduit through which water always flows, stable operation efficiency may be achieved. Since the rotational kinetic energy of the drive shaft 2 is large, the ball chain 17 is preferably installed in two rows for effective and stable power transmission, as shown in the figures. It is to be noted that another type of chain or a power transmission means such as a timing belt can be selected instead of the ball chain 17.

Figure 3:
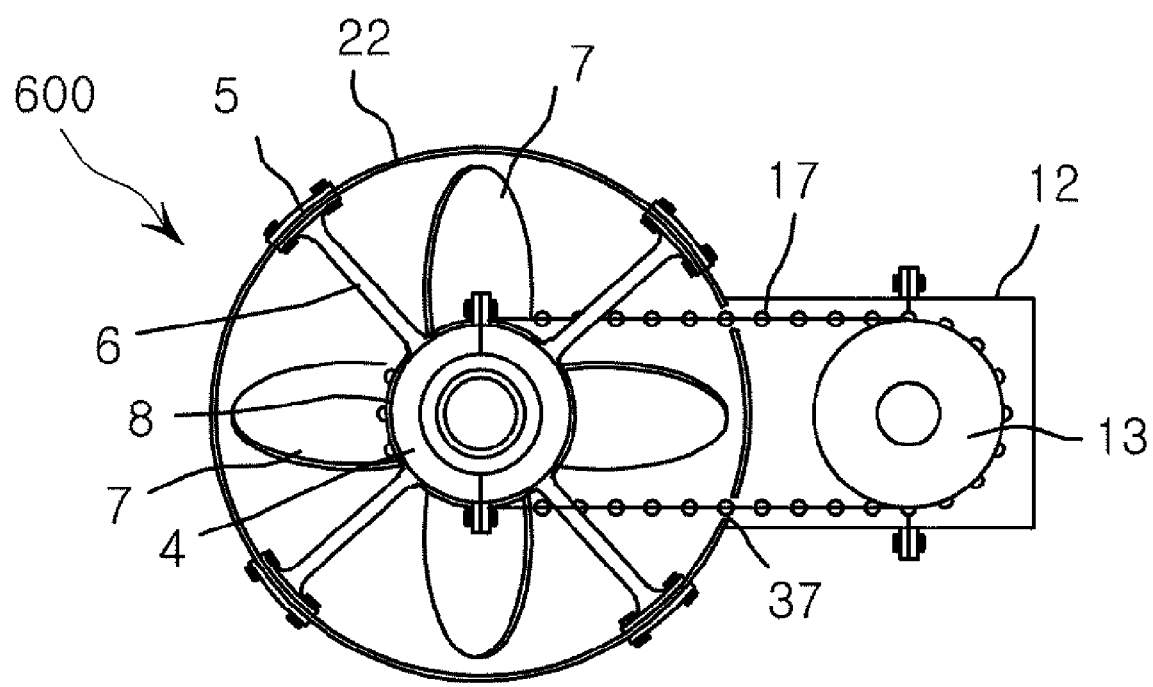
FIG. 3 is a plan view of FIG. 1.
Figure 4:
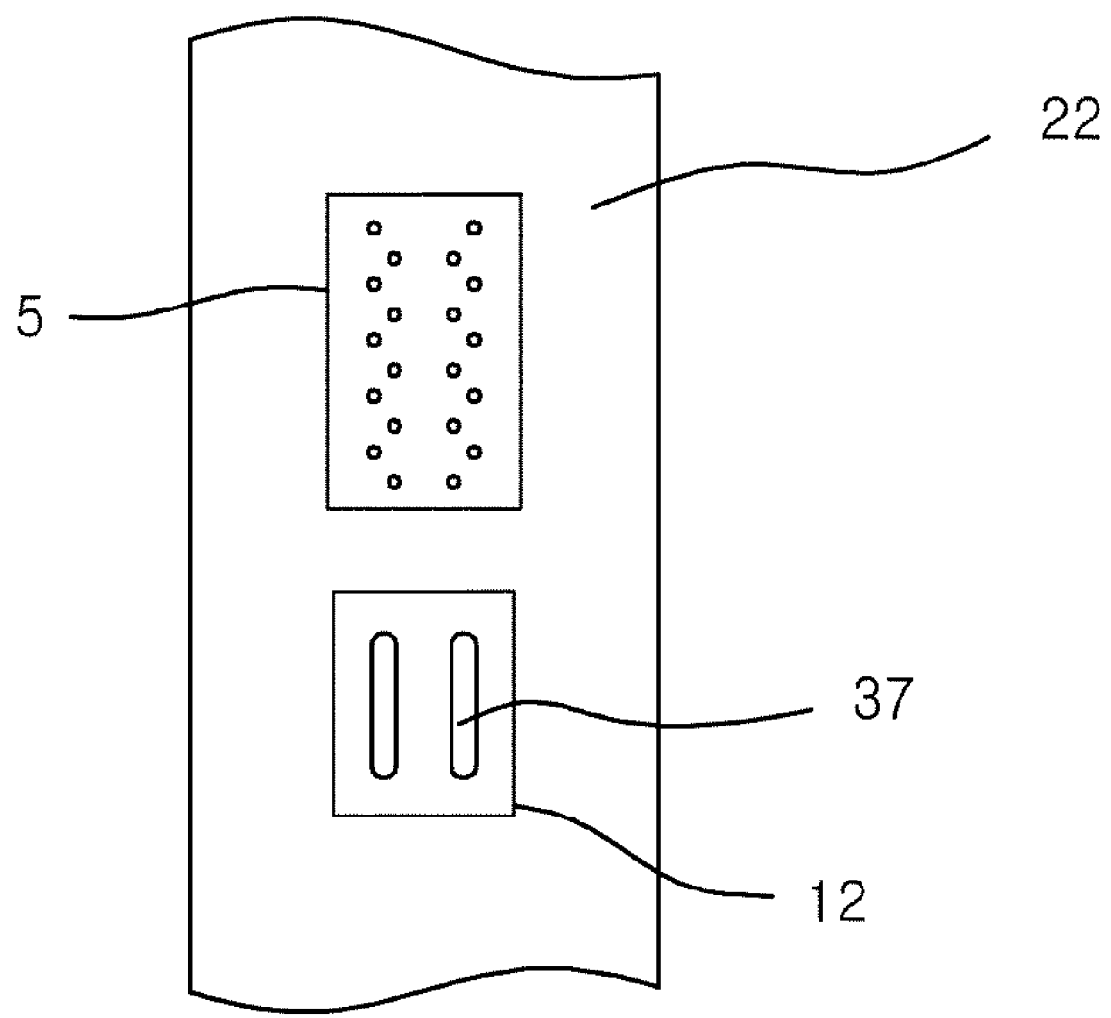
FIG. 4 is a view showing holes through which a ball chain passes and bolt holes for fixing member installation formed in the conduit of the present disclosure.
Figure 5:
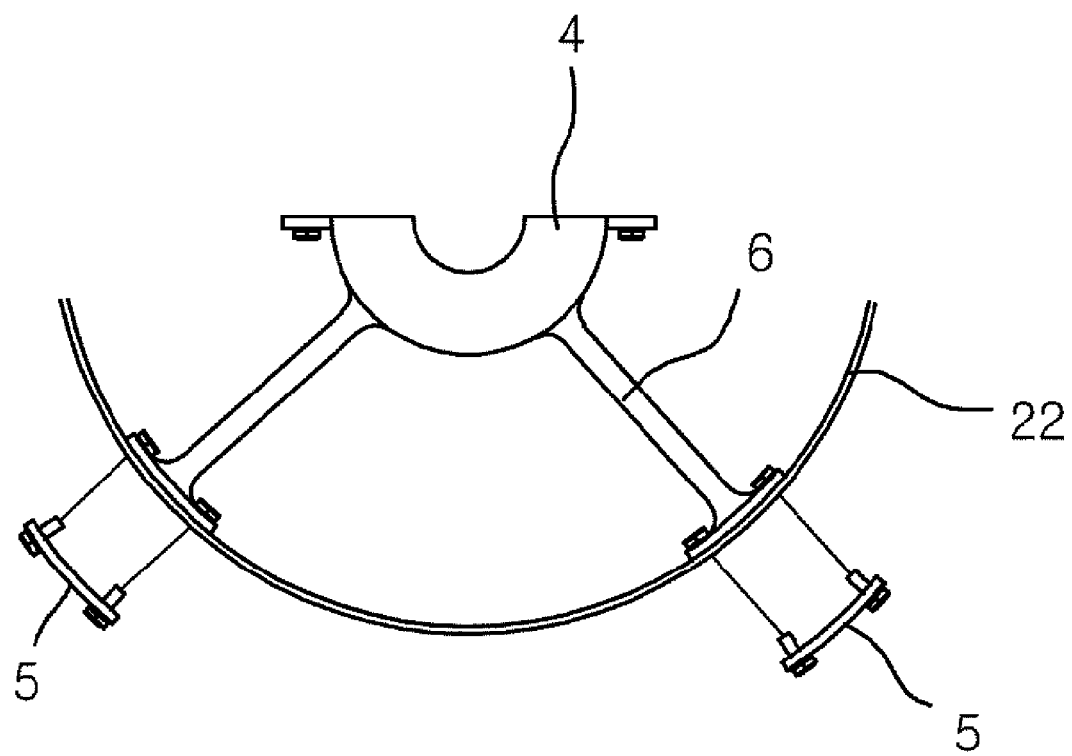
FIG. 5 is a plan view showing a disassembled state of a conduit support body and the fixing member.

The conduit support bodies 4 are also installed on both sides of the inner gear 8 to support stable rotation of the gear. In order to transmit power to the outer gear 13 through the ball chain 17, holes 37 are formed in the conduit 22 at positions where the ball chain 17 passes through the conduit (see FIGS. 3 and 4).

The inside of the outer gear 13 is sealed by a case 12 such that water inside does not flow out to the outside of the outer gear 13 and air is not introduced from the outside. The case 12 is coupled using bolts to facilitate connection or removal of internal devices.

The outer gear 13 and the generator 10 are connected coaxially, and the shaft 11 is axially supported by a bearing 14 so as to freely rotate. Power is connected between the shaft 11 and the generator 10 through coupling 15. The generator 10 is stably arranged outside the conduit 22 by a generator pedestal 24.

The flexible conduit 18 is welded to the lower end of the conduit 22 or fixed by fastening bolts to the flange. The flexible conduit 18 of a corrugated tube structure may be installed on the spiral inclined road 100 to compensate for the straightness of most of the conduit turbine unit 600. The flexible conduit may be used to correct the length error during the piping process to facilitate piping work. The flexible conduit may also facilitate removal of one of the conduit turbine units 600 installed in multiple stages for replacement or maintenance.

Further, when vibration is applied to the entire apparatus, the flexible conduit may absorb the vibration. Even when a natural disaster such as an earthquake occurs, the flexible conduit may act as a buffer to prevent shock from being transmitted to all of the conduits, thereby improving stability.

In this structure, the conduit turbine units 600 may be repeatedly installed in two or more stages in the water-guide conduit line 500 while being maintained at a constant interval.

At the end of the pipe of the conduit turbine unit 600 installed at the remote end, a discharge conduit 518 and a valve 511 are sequentially arranged and then connected to the lower reservoir 300.

The conduit turbine units 600 are connected to the water-guide conduit lines 500 in multiple stages at constant intervals along the spiral inclined road 100, which is installed in the form of a spiral curve shape from the bottom of the upper reservoir 200 located at the top floor to the lowest floor, and the positions thereof are secured fixed.

As shown in FIG. 7, when a flow volume is secured in the upper reservoir 200 by pumping water by the pump 400, the pumped-storage hydropower generation tower of the present disclosure generates electric power through the generator 10 of the conduit turbine unit 600 when the fluid introduced through the inlet water-guide conduit 510, which is formed at the top of the water-guide conduit line 500, falls. Then, water is collected in the lower reservoir 300 through the discharge conduit 518 and the valve 511, which are connected to the last conduit turbine unit 600.

In addition, air vent pipes 38 provided with an air vent 39 are arranged in each predetermined section in the middle of the water-guide conduit line 500 to discharge air from the conduits to the outside. In addition, the pump 400 is operated to perform a pumping operation to move the water in the lower reservoir 300 into the upper reservoir 200.

In the pumped-storage hydropower generation tower employing conduit turbines installed in multiple stages according to the present disclosure, the conduit turbine unit 600 may be constructed using a low-cost compact propeller 7, a generator 10, and the like. By installing the conduit turbines in multiple stages in the water-guide conduit line 500, large power may be produced at low cost. Further, the number of conduit turbines may be easily increased or decreased as needed.

In addition, since the pumped-storage hydropower generation tower employing conduit turbines installed in multiple stages according to the present disclosure has conduit turbines installed at the location instead of the water-guide conduit line 500, efficient power storage and production may be implemented, and installation space may be saved.

Further, in the pumped-storage hydropower generation tower employing conduit turbines installed in multiple stages according to the present disclosure, the pipes are arranged along the spiral inclined passage 100, and the conduit turbine units 600 having a long pipe length as a whole are installed in multiple stages. Accordingly, an ESS using potential energy of water may be constructed.

Hereinafter, the operation of the pumped-storage hydropower generation tower according to the present disclosure will be described.

First, the lower reservoir 300 is filled with water from a water source such as municipal water supply, groundwater or a nearby reservoir, and the pump 400 is operated. Then, the water moves along the pumping pipe 410 to fill the upper reservoir 200 up to a certain level or higher.

Then, when the valve 511 of the water-guide conduit line 500 is opened, the flow in the conduit falling from the upper reservoir 200 passes through each conduit turbine unit 600, the propellers 7 are rotated by the energy of flow state quantities (free fall, fluid volume, flow rate), and power is generated from the generator 10 that receives power transmitted by the ball chain 17. The respective amounts of generated electricity are combined and voltage-transformed by a transformer. Then, power is supplied along the transmission or distribution line.

When any one of the conduit turbine units 600 that are installed in multiple stages fails, only the propeller 7 of the failed conduit turbine unit 600 runs idling, and the remaining conduit turbine units 600 may continue to generate power, and the power generated by the remaining conduit turbine units 600 may be appropriately voltage-transformed and supplied. Therefore, high stability may be obtained in power supply.

The water-guide conduit line 100 includes a work passage space 117 allowing a work vehicle or operator to move therethrough to perform maintenance work when inspection or maintenance is needed, and a piping space 113 in which the conduit turbine units 600 are installed.

Workers may carry equipment and a conduit turbine unit 600 to be installed on foot or by car through the work passage space 117 from the ground to a floor where a need for maintenance or inspection has occurred. In addition, workers or equipment may be quickly moved to a desired floor using the elevator 700 installed vertically in the center of the apparatus of the present disclosure. In addition, an observatory may be installed at a position higher than the upper reservoir 200 at the top. In this case, the observatory may be directly connected to the elevator 700.

In the pumped-storage hydropower generation tower of the present disclosure, each conduit turbine unit 600 may generate power with the same power generation capacity. Since the conduit turbine units are connected in multiple stages, it may be easy to increase the total power generation capacity.

Since the apparatus of the present disclosure is constructed by selecting an area having an actual demand, the construction of transmission towers or transmission lines may be minimized, and the total power generation capacity may be increased in a short period of time.

Exemplary embodiments of the present disclosure have been described in detail, but the pumped-storage hydropower generation tower employing conduit turbines installed in multiple stages according to the present disclosure is not limited thereto. Those skilled in the art will appreciate that various modifications and changes are possible, without departing from the idea and scope of the disclosure.

All simple modifications and changes of the present disclosure belong to the scope of the present disclosure, and the scope of protection sought for by the present disclosure will be apparent from the appended claims.

The invention claimed is:

1. A pumped-storage hydropower generation tower employing conduit turbines installed in multiple stages, comprising:
   a pump (400) piped to a pumping pipe (410) to pump water contained in a lower reservoir (300) to an upper reservoir (200);
   a water-guide conduit line (500) connected to an inlet water-guide conduit (510) from a bottom surface of one side of the upper reservoir (200) and extending to a position of the lower reservoir (300) along a spiral inclined passage (100) to allow a flow for power generation to pass therethrough; and
   a conduit turbine unit (600) comprising:
   a drive shaft (2) extending through a center of a conduit (22), the flow passing through the conduit (22);
   a conduit support body (4) arranged to rotatably support the drive shaft (2), and having an arm (6) extending toward an inner surface of the conduit (22);
   a propeller (7) fixed to the drive shaft (2) in between the conduit support body (4) and rotated by movement of the flow; and
   a generator (10) configured to generate electricity by rotational power received from the drive shaft (2),
   wherein the conduit turbine unit (600) has at least two conduit turbine units (600) disposed in the water-guide conduit line (500) in multiple stages.

2. The pumped-storage hydropower generation tower of claim 1, wherein the conduit turbine unit (600) further comprises:
   an inner gear (8) arranged in between the conduit support body (4) and rotated together with the drive shaft (2); and
   an outer gear (13) arranged outside the conduit (22) and driven together with a shaft (15) when rotational power is transmitted to the inner gear (8) through a power transmission means,
   wherein the generator (10) receivers rotational power through the outer gear (13) and the shaft (15).

3. The pumped-storage hydropower generation tower of claim 1, wherein a leading end of each of the conduit support body (4) is provided with a pressure support (3), the pressure support (3) being integrally coupled to the drive shaft (2),
   wherein a thrust bearing (26) is arranged between contact portions of the conduit support body (4) and the pressure support (3).

4. The pumped-storage hydropower generation tower of claim 1, wherein the arm (6) of the conduit support body (4) has a flat plate shape having a cross-sectional area causing minimum resistance against streamline and an axial length greater than a radius of the conduit (22).

5. The pumped-storage hydropower generation tower of claim 1, further comprising:
   a flexible conduit (18) extending from a lower end of the conduit (22) and formed in a corrugated tube structure.

6. The pumped-storage hydropower generation tower of claim 1, further comprising:
   a spiral inclined passage (100) supported by a plurality of inner frame pillars (116) and outer frame pillars (114), and extending from a ground to a predetermined height in a spiral shape;
   an upper reservoir (200) positioned at an upper portion of the spiral inclined passage (100) and filled with water while being supported by the inner frame pillars (116) and the outer frame pillars (114); and
   a lower reservoir (300) positioned on the ground while maintaining a height difference from the upper reservoir (200).

7. The pumped-storage hydropower generation tower of claim 6, further comprising:
   an elevator (700) installed in an inner center of the spiral inclined passage (100) to move from the ground to each floor and an uppermost position of the upper reservoir (200).

* * * * *